United States Patent
Meylan et al.

(10) Patent No.: US 10,419,170 B2
(45) Date of Patent: Sep. 17, 2019

(54) RRC AWARE TCP RETRANSMISSIONS

(71) Applicant: QUALCOMM Incorporated, San Deigo, CA (US)

(72) Inventors: Arnaud Meylan, San Diego, CA (US); Can Zhao, San Diego, CA (US); Susheel Kumar Yadav Yadagiri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 260 days.

(21) Appl. No.: 14/633,095

(22) Filed: Feb. 26, 2015

(65) Prior Publication Data

US 2016/0254881 A1    Sep. 1, 2016

(51) Int. Cl.
*H04L 1/18*    (2006.01)
(52) U.S. Cl.
CPC .............. *H04L 1/188* (2013.01); *H04L 1/189* (2013.01); *H04L 1/1838* (2013.01)
(58) Field of Classification Search
None
See application file for complete search history.

(56) References Cited

U.S. PATENT DOCUMENTS

| | | | | |
|---|---|---|---|---|
| 4,628,504 A * | 12/1986 | Brown | ............... | H04L 12/417 370/458 |
| 5,585,952 A * | 12/1996 | Imai | ............... | H04L 29/06 340/7.21 |
| 6,076,114 A * | 6/2000 | Wesley | ............... | H04L 29/06 370/230 |
| 6,611,521 B1 * | 8/2003 | McKay | ............... | H04L 1/08 370/392 |
| 6,977,913 B1 * | 12/2005 | Ishii | ............... | H04W 72/02 370/329 |
| 7,000,021 B1 * | 2/2006 | Radhakrishnan | ..... | H04L 1/1614 370/394 |

(Continued)

FOREIGN PATENT DOCUMENTS

CN    103260212 A    8/2013
EP    2809126 A1    12/2014
(Continued)

OTHER PUBLICATIONS

International Search Report and Written Opinion—PCT/US2016/013233—ISA/EPO—dated Mar. 22, 2016.

*Primary Examiner* — Christopher T Wyllie
(74) *Attorney, Agent, or Firm* — Arent Fox, LLP

(57) ABSTRACT

A method, an apparatus, and a computer program product for wireless communication are provided. The apparatus transmits, by a user equipment (UE), a packet to a network entity, while the UE is in a radio resource control (RRC) connected mode. The apparatus determines an acknowledgment (ACK) is absent for the transmitted packet. The apparatus determines to retransmit the packet based at least on whether the UE is in the RRC connected mode or on a type of the packet, upon determining the ACK is absent. The apparatus may determine to retransmit the packet by retransmitting the packet upon determining the UE is in the RRC connected mode. The apparatus may determine to retransmit the packet by suppressing retransmission of the packet upon determining that the UE is not in the RRC connected mode.

20 Claims, 11 Drawing Sheets

(56) References Cited

U.S. PATENT DOCUMENTS

| | | | |
|---|---|---|---|
| 7,657,628 B1* | 2/2010 | McDysan | G06F 11/2028 370/401 |
| 8,171,227 B1* | 5/2012 | Goldschmidt | H04L 67/2852 711/121 |
| 8,730,969 B2 | 5/2014 | Yi et al. | |
| 8,737,294 B2 | 5/2014 | Chen | |
| 2004/0184427 A1* | 9/2004 | Lynch | H04L 12/1863 370/342 |
| 2004/0199808 A1* | 10/2004 | Freimuth | H04B 1/74 714/4.11 |
| 2005/0117576 A1* | 6/2005 | McDysan | H04L 45/308 370/389 |
| 2005/0157646 A1* | 7/2005 | Addagatla | H04L 47/10 370/232 |
| 2006/0164987 A1* | 7/2006 | Ruiz Floriach | H04L 29/06027 370/235 |
| 2006/0191003 A1* | 8/2006 | Bahk | H04L 63/0254 726/14 |
| 2007/0230390 A1* | 10/2007 | Takatani | H04J 3/1617 370/315 |
| 2008/0186892 A1* | 8/2008 | Damnjanovic | H04W 52/0216 370/311 |
| 2008/0253387 A1* | 10/2008 | Liang | H04L 1/1877 370/412 |
| 2009/0040926 A1* | 2/2009 | Li | H04L 41/0893 370/230.1 |
| 2009/0259910 A1* | 10/2009 | Lee | H04L 1/1877 714/748 |
| 2009/0319824 A1* | 12/2009 | Liu | H04L 12/1868 714/4.1 |
| 2010/0042882 A1 | 2/2010 | Randall | |
| 2010/0067606 A1* | 3/2010 | Feng | H04L 1/1893 375/268 |
| 2010/0232438 A1* | 9/2010 | Bajpai | H04L 69/16 370/400 |
| 2011/0058482 A1* | 3/2011 | Nomura | H04L 29/12264 370/241 |
| 2011/0223924 A1* | 9/2011 | Lohr | H04W 72/042 455/450 |
| 2011/0227757 A1* | 9/2011 | Chen | G08G 1/0104 340/902 |
| 2012/0030319 A1* | 2/2012 | Andries | H04L 41/5009 709/220 |
| 2012/0063342 A1* | 3/2012 | Shiotani | H04L 63/12 370/252 |
| 2012/0207070 A1* | 8/2012 | Xu | H04W 52/0225 370/311 |
| 2013/0021982 A1* | 1/2013 | Kim | H04L 1/1887 370/328 |
| 2013/0058301 A1* | 3/2013 | Lee | H04L 1/1877 370/329 |
| 2013/0142052 A1* | 6/2013 | Burbidge | H04W 76/18 370/242 |
| 2013/0166982 A1* | 6/2013 | Zheng | H04L 1/1877 714/748 |
| 2013/0315092 A1* | 11/2013 | Yu | H04W 52/0216 370/252 |
| 2013/0340977 A1* | 12/2013 | Singleton | F28D 15/02 165/104.21 |
| 2014/0068396 A1* | 3/2014 | Hong | G06F 11/08 714/799 |
| 2014/0219184 A1 | 8/2014 | Makharia et al. | |
| 2015/0016261 A1* | 1/2015 | Backholm | H04L 47/32 370/235 |
| 2015/0092645 A1* | 4/2015 | Tabet | H04L 1/1825 370/311 |
| 2015/0092708 A1* | 4/2015 | Su | H04W 76/16 370/329 |
| 2015/0124671 A1* | 5/2015 | Tabet | H04W 52/0216 370/311 |
| 2015/0189009 A1* | 7/2015 | van Bemmel | H04L 67/1008 709/226 |
| 2015/0334588 A1* | 11/2015 | Cui | H04W 36/26 370/252 |
| 2016/0044740 A1* | 2/2016 | Siomina | H04W 72/02 455/522.1 |
| 2016/0105471 A1* | 4/2016 | Nunes | H04L 12/4633 709/228 |
| 2016/0112159 A1* | 4/2016 | Banthia | G06Q 20/327 714/748 |

FOREIGN PATENT DOCUMENTS

| | | |
|---|---|---|
| WO | 2008133477 A1 | 11/2008 |
| WO | 2010071333 A2 | 6/2010 |

* cited by examiner

RRC AWARE TCP RETRANSMISSIONS

BACKGROUND

Field

The present disclosure relates generally to communication systems, and more particularly, to transmissions of a packet (e.g., a Transmission Control Protocol (TCP) packet).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus transmits, by a user equipment (UE), a packet to a network entity, while the UE is in a radio resource control (RRC) connected mode. The apparatus determines an acknowledgment (ACK) is absent for the transmitted packet. The apparatus determines to retransmit the packet based at least on whether the UE is in the RRC connected mode or on a type of the packet, upon determining the ACK is absent. The apparatus may determine to retransmit the packet by retransmitting the packet upon determining the UE is in the RRC connected mode. The apparatus may determine to retransmit the packet by suppressing retransmission of the packet upon determining that the UE is not in the RRC connected mode.

In accordance with an aspect, a method of wireless communications is disclosed. For example, the method may include transmitting, by a UE, a packet to a network entity, while the UE is in a RRC connected mode. Further, the method may determining an ACK is absent for the transmitted packet. Moreover, the method may include determining to retransmit the packet based at least on whether the UE is in the RRC connected mode or on a type of the packet, upon determining the ACK is absent.

In accordance with another aspect, an apparatus configured for wireless communications is disclosed. In such an aspect, the apparatus may include a memory and at least one processor coupled to the memory. Further, the at least one processor may be configured to transmit, by a user equipment (UE), a packet to a network entity, while the UE is in a radio resource control (RRC) connected mode, determine an acknowledgment (ACK) is absent for the transmitted packet, and determine to retransmit the packet based at least on whether the UE is in the RRC connected mode or on a type of the packet, upon determining the ACK is absent.

In accordance with another aspect, another apparatus configured for wireless communications is disclosed. In such an aspect, the apparatus may include a transmitter configured to transmit, by a UE, a packet, to a network entity, while the UE is in a RRC connected mode. Further, the apparatus may include means for determining an ACK is absent for the transmitted packet. Moreover, the apparatus means for determining may be configured to determine to retransmit the packet based at least on whether the UE is in the RRC connected mode or on a type of the packet, upon determining the ACK is absent.

In accordance with another aspect, a computer-readable medium storing computer executable code for wireless communication is disclosed. In such an aspect, the computer-readable medium may include computer executable code for transmitting, by a UE, a packet, to a network entity, while the UE is in a RRC connected mode. Further, the computer-readable medium may include computer executable code for determining an ACK is absent for the transmitted packet. Moreover, the computer-readable medium may include computer executable code for determining to retransmit the packet based at least on whether the UE is in the RRC connected mode or on a type of the packet, upon determining the ACK is absent.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1:
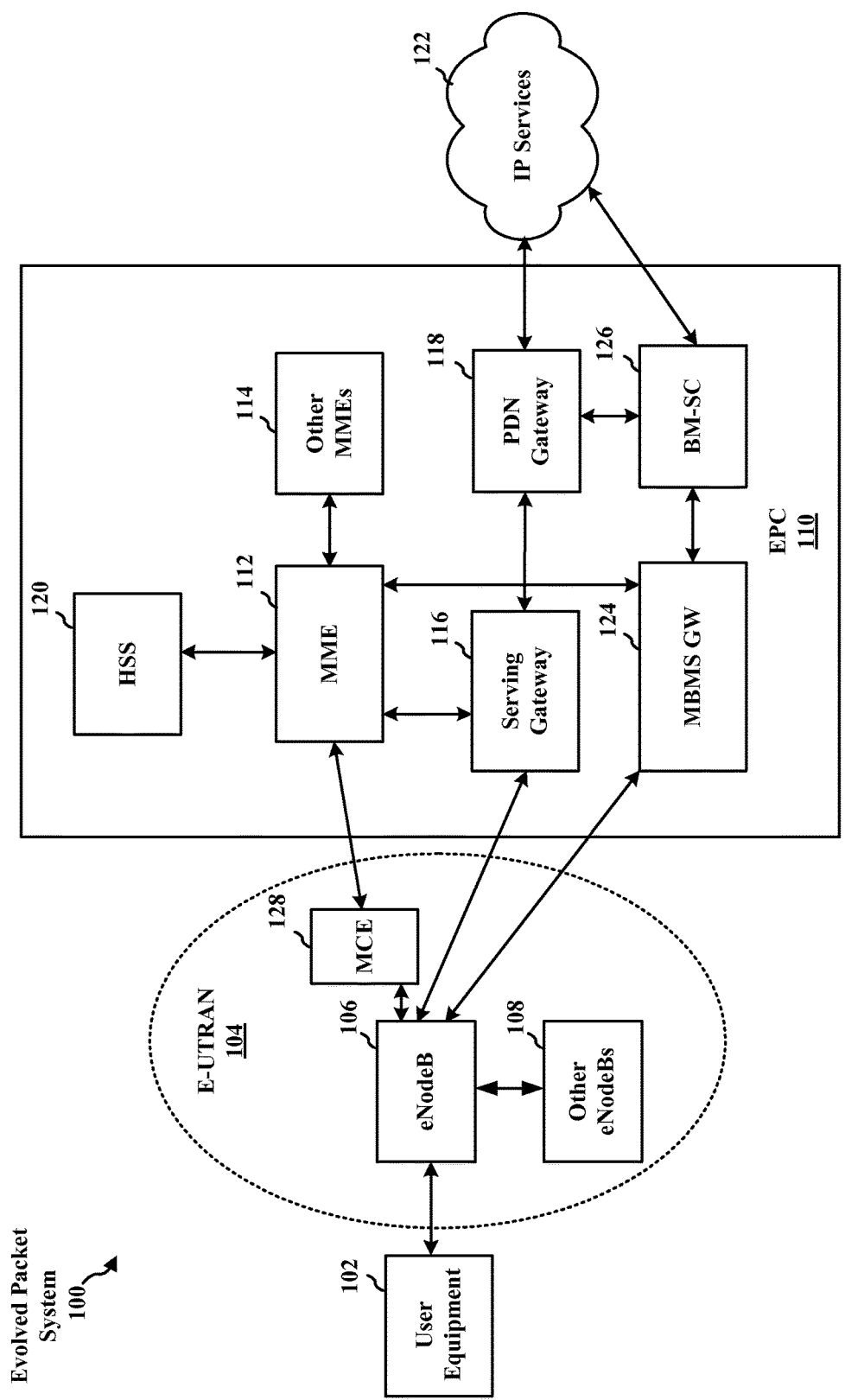
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
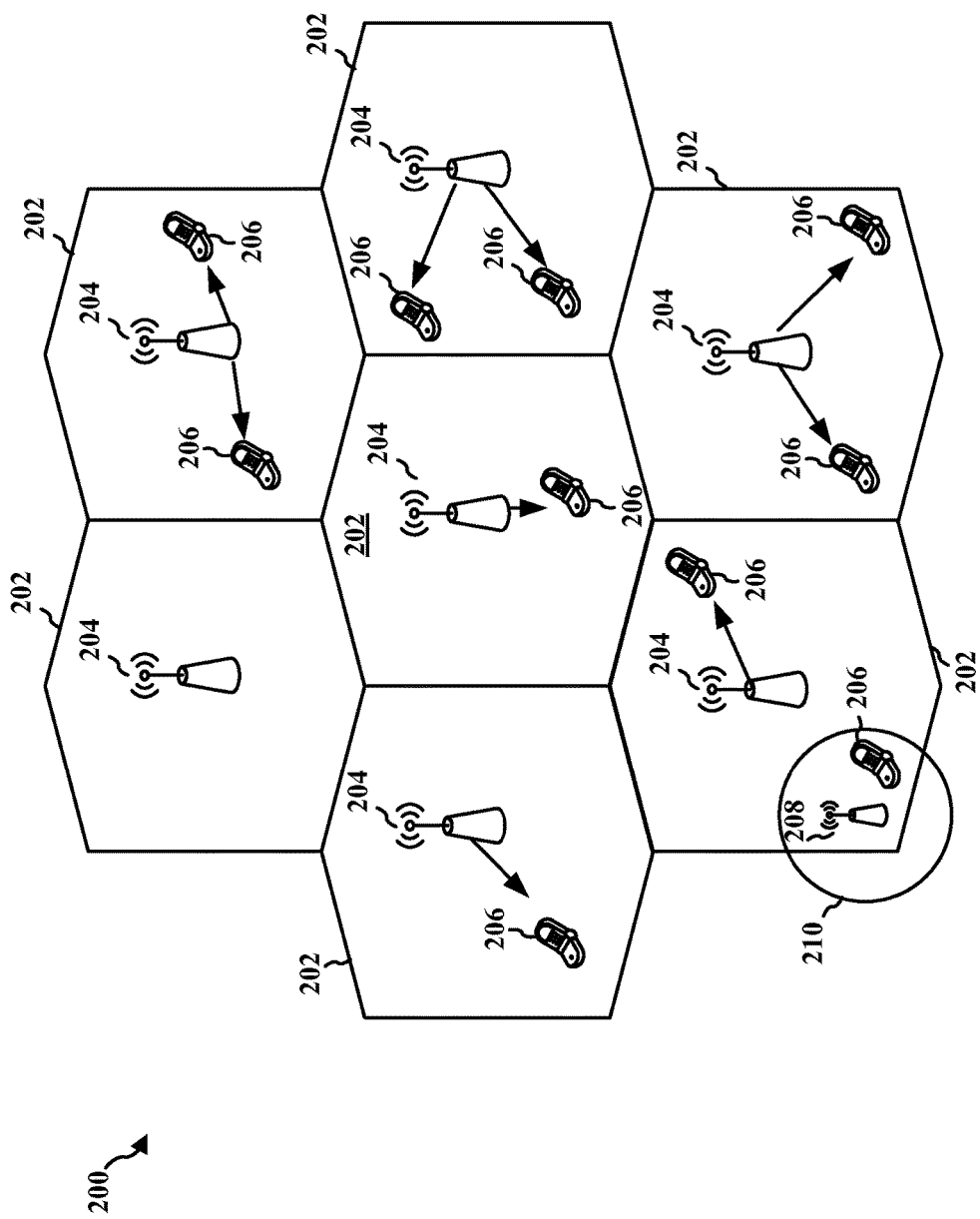
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
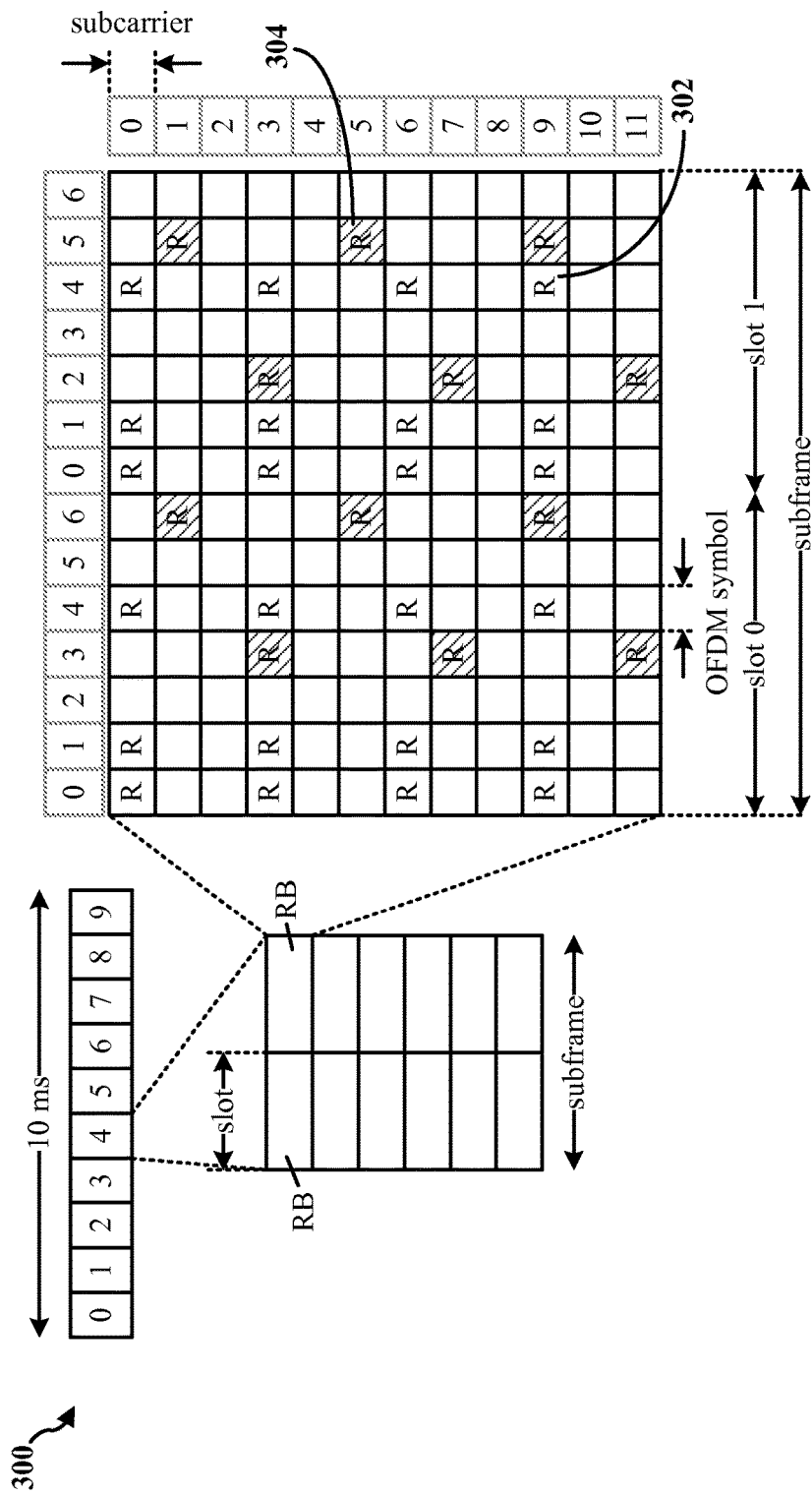
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
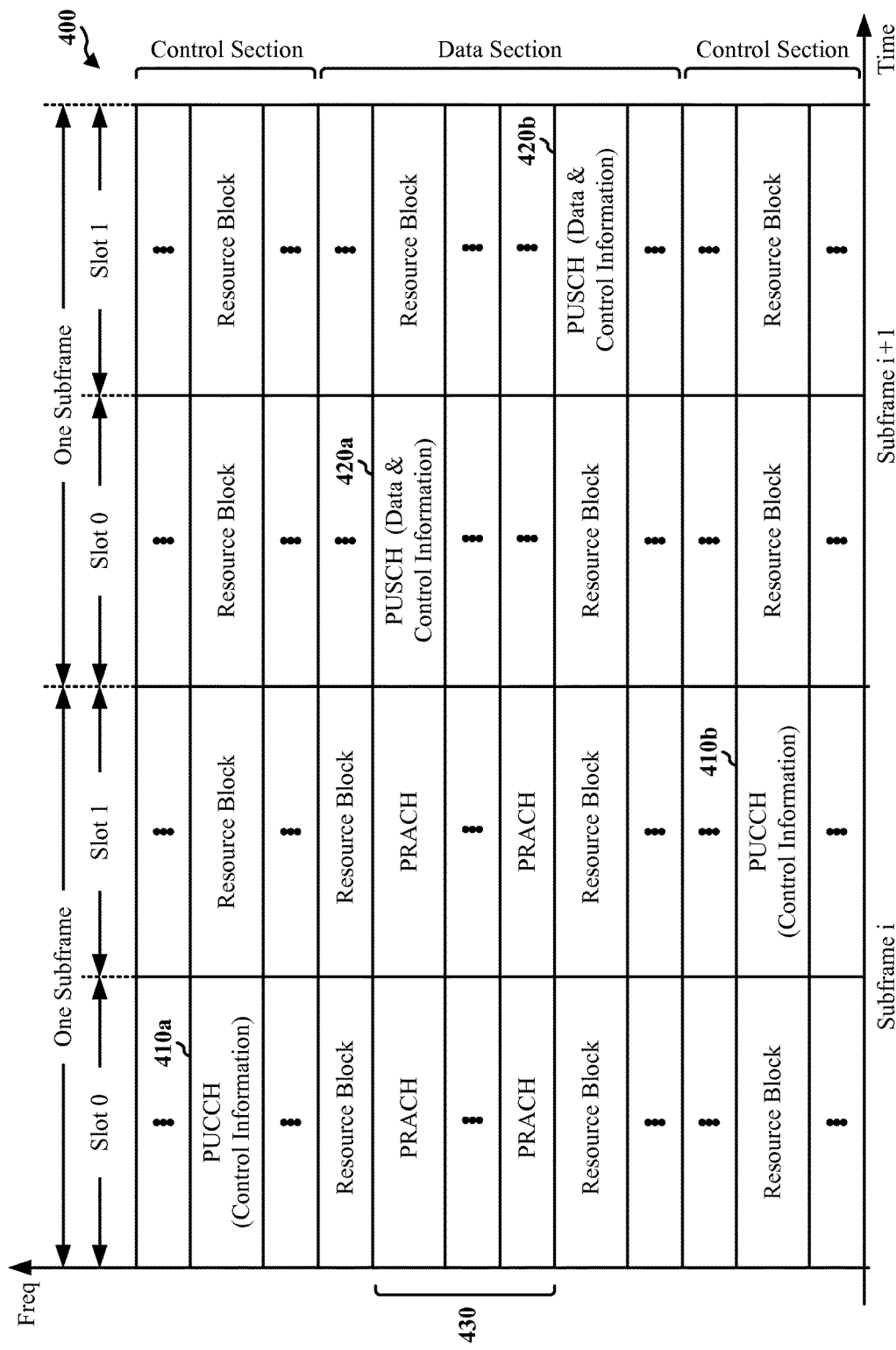
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
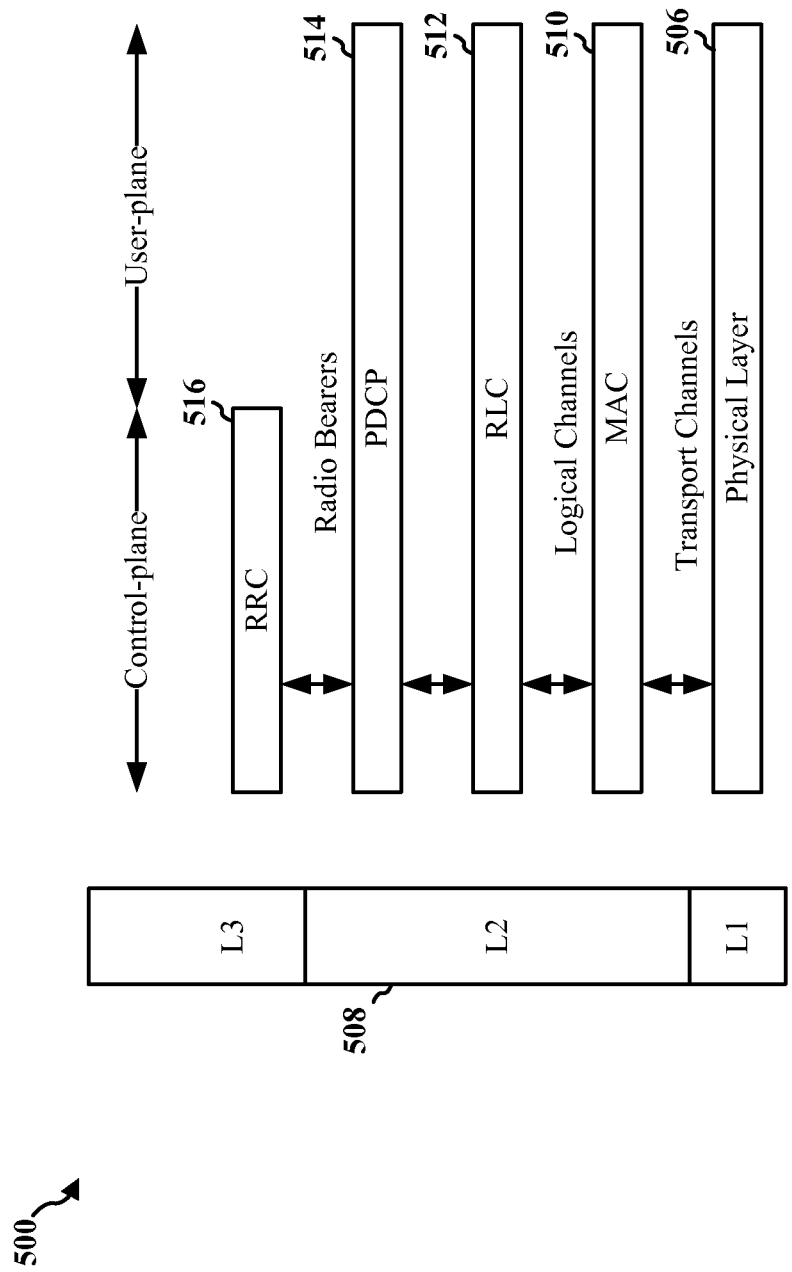
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
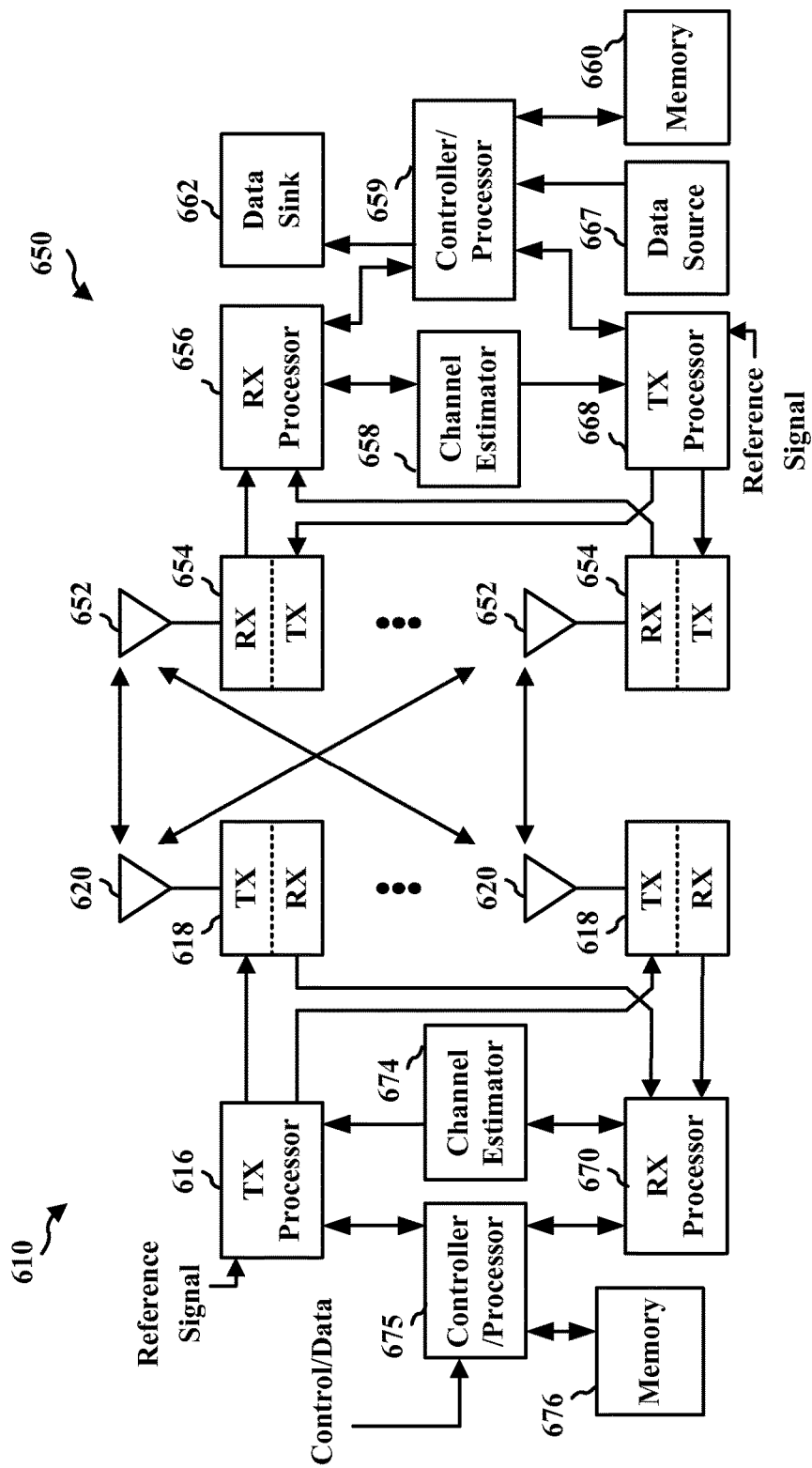
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

An RRC state of a UE (e.g., UE 206, 650) may be either RRC_IDLE or RRC_CONNECTED. In the RRC_IDLE state, the UE performs cell selection and reselection. Accordingly, the UE decides the cell on which it camps. While in the RRC_IDLE state, the UE monitors a paging channel to detect incoming connection requests, and also acquires system information (SI). The SI includes parameters used by the network (e.g., E-UTRAN) to control the cell selection (or reselection) process. In the RRC_CONNECTED state, the UE is connected to a known cell. The UE is allocated radio resources (e.g., by the E-UTRAN) to transfer data (e.g., unicast data) via shared data channels. Accordingly, data transfer to/from the UE can occur while the UE is in the RRC_CONNECTED state. The UE also receives SI, which includes information required to use the transmission channels.

Figure 7:
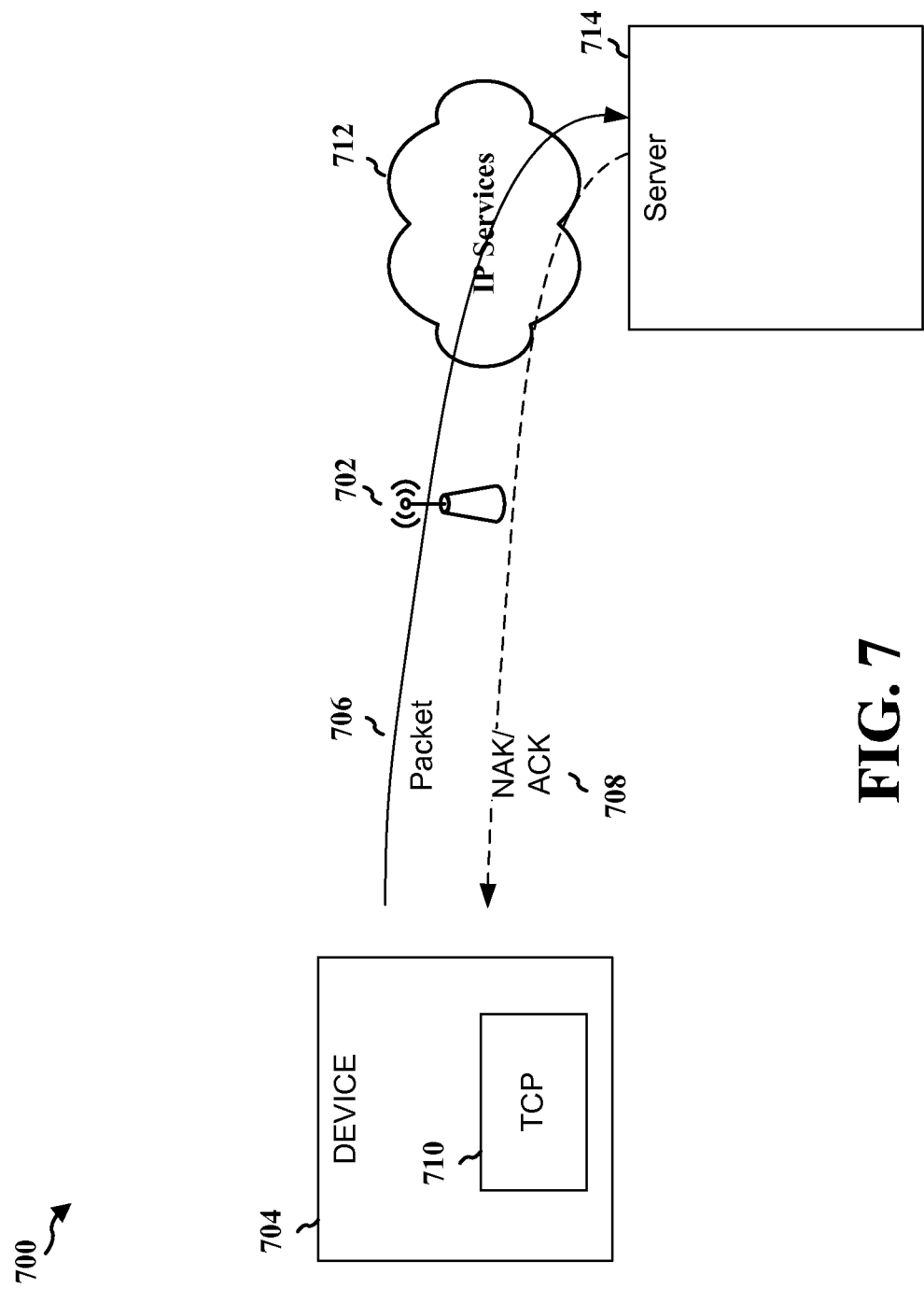
FIG. 7 is a diagram of a communications system.

FIG. 7 shows a device (e.g., a UE) 704 and a network entity (e.g., eNB 702).

The UE 704 may include a Transmission Control Protocol (TCP) layer 710. The UE 704 is in a RRC_CONNECTED mode. While the UE 704 is in the RRC_CONNECTED mode, the UE 704 (e.g., the TCP layer 710) transmits a packet 706 to a server (e.g., a remote network server) 714 via the eNB 702.

The packet 706 may be of a type such that successful transmission of the packet is followed by receipt of an ACK via the eNB 702. The ACK may be transmitted by the server 714 via the eNB 702. Further, the ACK may be transmitted via the eNB 702 and IP Services 712. Accordingly, an acknowledgment/negative acknowledgment 708 (ACK/NAK) for the transmitted packet 706 may be received by the UE 704 (e.g., the TCP layer 710). If the UE 704 (e.g., the TCP layer 710) receives an ACK, the UE (e.g., the TCP layer) may conclude that the packet 706 was successfully received. If the UE 704 (e.g., the TCP layer 710) receives a NAK, the UE (e.g., the TCP layer) may conclude that the packet 706 was not successfully received. If the NAK is received, the UE 704 (e.g., the TCP layer 710) may retransmit the packet 706.

It is possible that the UE 704 (e.g., the TCP layer 710) does not receive an ACK/NAK 708 after the packet 706 is transmitted. This may occur, for example, if a connection between the UE 704 and the server 714 (e.g., a TCP connection) is broken or not operating properly for some reason. In this situation, the server 714 may cease to respond to transmissions by the UE 704 (e.g., the TCP layer 710). Thus, despite transmission of the packet 706 to the server 714, the UE 704 (e.g., the TCP layer 710) does not receive an ACK or a NAK of the packet in response to the transmission. Accordingly, the UE 704 (e.g., the TCP layer 710) may be unable to determine whether the packet 706 was successfully received at the receiving entity.

Aspects of the disclosure are directed to determining to retransmit a packet when an ACK/NAK is not received.

When the UE 704 is in the RRC_CONNECTED mode, the UE (e.g., the TCP layer 710) may attempt retransmission of the packet 706 to the server 714 via the eNB 702. Each retransmission may be followed by a period during which the UE 704 (e.g., the TCP layer 710) waits for an ACK/NAK 708 to be received. If no ACK/NAK 708 is received during this period, the UE 704 (e.g., the TCP layer 710) may perform another retransmission of the packet 706. Up to a certain number of retransmissions may be performed (e.g., before an RRC inactivity timer expires). When the RRC inactivity timer expires, the UE may exit the RRC_CONNECTED mode and enter the RRC_IDLE mode.

For example, according to the TCP, the UE 704 (e.g., the TCP layer 710) may attempt retransmission of a packet up to 15 times. The time backoff (e.g., a retransmission timing interval, or the period between consecutive retransmissions) may increase with each retransmission. In one situation, if the RRC inactivity timer is set to 10 seconds, a total of up to 4 transmissions (e.g., an initial transmission and 3 subsequent retransmissions) of the same packet may be performed. This situation will be described in more detail with reference to FIG. 8.

Figure 8:
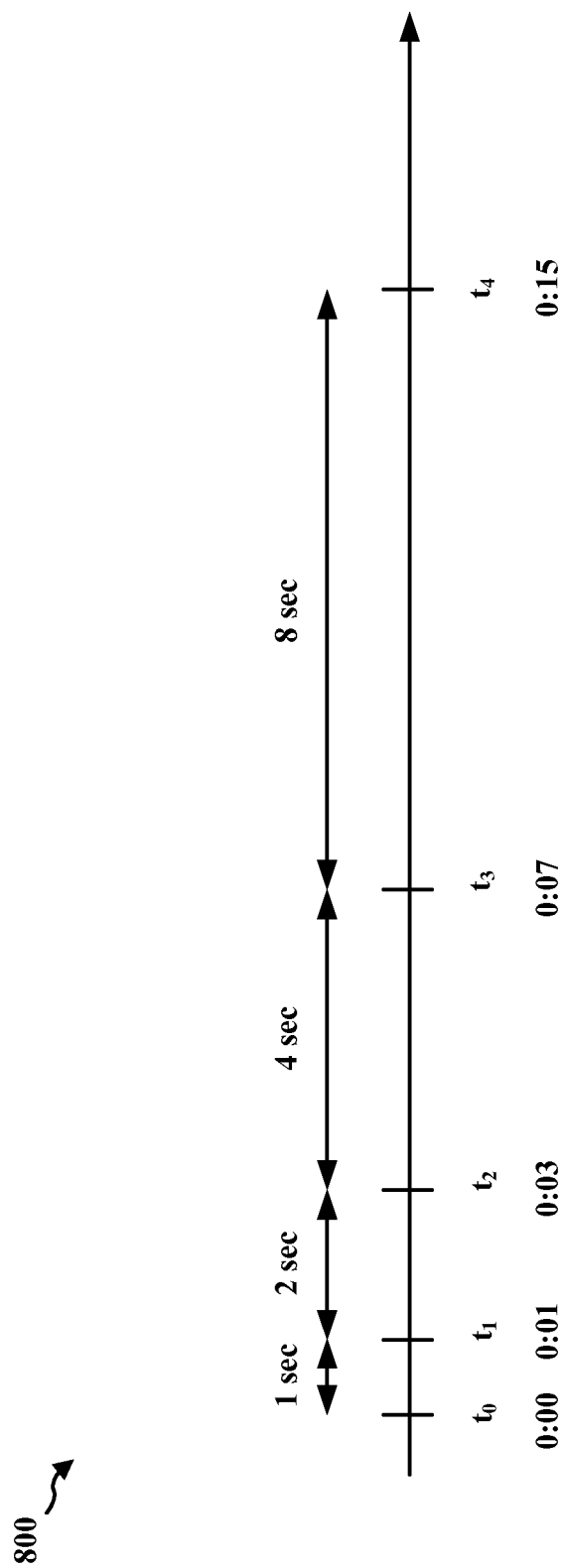
FIG. 8 is an example timing diagram.

FIG. 8 shows an example timing diagram 800. The UE (e.g., TCP layer 710 of UE 704) performs an initial transmission of the packet (e.g., packet 706) at time $t_0$. The UE then waits to receive an ACK/NAK (e.g., ACK/NAK 708) from the server (e.g., server 714) via the eNB (e.g., eNB 702). The UE may wait for a time backoff, e.g., a period of 1 second, before taking additional action (e.g., before performing a first retransmission of the packet).

If an ACK or a NAK is not received within 1 second after $t_0$ (e.g., no ACK or NAK is received by the arrival of time $t_1$=0:01 minutes), the UE performs a first retransmission of the packet at time $t_1$. The time backoff is subsequently increased. For example, the time backoff may be doubled, such that it is increased from 1 second to 2 seconds. The UE may wait for the time backoff, e.g., a period of 2 seconds, before taking additional action (e.g., a second retransmission of the packet).

If no ACK or NAK is received within 2 seconds after $t_1$ (e.g., no ACK or NAK is received by the arrival of time $t_2$=0:03 minutes), the UE performs a second retransmission of the packet at time $t_2$. The time backoff is again subsequently increased. For example, the time backoff may be doubled again, such that it is increased from 2 seconds to 4 seconds. The UE may wait for a time backoff, e.g., a period of 4 seconds, before taking additional action (e.g., a third retransmission of the packet).

If no ACK or NAK is received within 4 seconds after $t_2$ (e.g., by the arrival of time $t_3$=0:07 minute), the UE performs a third retransmission of the packet at time $t_3$. The time backoff is again subsequently increased. For example, the time backoff may be doubled again, such that is increased from 4 seconds to 8 seconds. The UE may wait for a time backoff, e.g., a period of 8 seconds, before taking additional action (e.g., a fourth retransmission of the packet).

As noted earlier, the RRC inactivity timer may be set to 10 seconds. In this situation, 3 seconds after the third retransmission occurs at time $t_3$, the RRC inactivity expires. If no ACK or NAK is received by the time the RRC inactivity expires, the UE may suppress further retransmissions of the packet. The UE may exit the RRC_CONNECTED mode. Further, the UE may enter the RRC_IDLE mode.

Retransmission of a packet may cause additional RRC connections to be established. In addition, retransmission of packets may increase power consumption.

Aspects of the disclosure are directed to determining whether to retransmit the packet when it is determined that the ACK is absent. According to such aspects, the number of retransmissions of a packet may be reduced. As such, the establishment of additional RRC connections may be reduced. In addition, power consumption may be reduced.

According to one aspect, a UE (e.g., TCP layer 710 of UE 704) determines whether to retransmit the packet based at least whether the UE is in the RRC connected mode.

The UE may retransmit the packet upon determining that the UE is in the RRC_CONNECTED mode. The UE may suppress further retransmissions of the packet upon determining that the UE is not in the RRC_CONNECTED mode. The UE may transition from the RRC_CONNECTED mode to the RRC_IDLE mode if, e.g., the RRC inactivity timer expires, thereby indicating that the UE has not transmitted or received packets for a corresponding length of time. When further retransmissions of the packet are suppressed, the retransmissions do not occur. In suppressing further retransmission, the UE may edit the application program IPTABLES to specify DROP TCP RETRANSMISSION for the relevant address.

The determination of whether the UE is in the RRC_CONNECTED mode may be event-based. For example, when the UE is in the RRC_CONNECTED mode, an event (e.g., a message) may be sent to the UE, such the UE determines that it is in the RRC_CONNECTED MODE. When an eNB (e.g., eNB 702) desires to release the RRC connection, the eNB will send an RRC release message to the UE, such that the UE knows to transition to the RRC_IDLE mode. For example, with reference back to FIG. 8, the UE may determine that it is no longer in the RRC_CONNECTED mode at a time between $t_0$ and $t_1$. In this situation, the UE suppresses retransmissions that may have occurred (e.g., at $t_1$, $t_2$, $t_3$). Therefore, the packet is transmitted only once.

As another example, with continued reference to FIG. 8, the UE may determine that it is no longer in the RRC_CONNECTED mode at a time between $t_1$ and $t_2$. In this situation, the UE may perform the first retransmission of the packet at $t_1$. However, the UE suppresses subsequent retransmissions that may have occurred (e.g., at $t_2$, $t_3$). Therefore, the packet is transmitted only twice.

As another example, with continued reference to FIG. 8, the UE may determine that it is no longer in the RRC_CONNECTED mode at a time between $t_2$ and $t_3$. In this situation, the UE suppresses retransmissions that may have occurred (e.g., at $t_3$). Therefore, the packet is transmitted only three times.

According to another aspect, the UE determines whether to retransmit the packet based on a type of the packet (e.g., packet 706) that is transmitted. For example, the UE may retransmit the packet if a number of retransmissions of the packet is less than or equal to a threshold number (or threshold value). The threshold number may be based on (e.g., sized according to) the type of the packet. The threshold number may be selected such that the UE is able to retransmit the packet the threshold number of times before an RRC inactivity timer expires.

Based on the number of retransmissions that may have occurred by a given time, the UE may determine whether to retransmit the packet at the given time. For example, the UE may suppress retransmission of the packet if a number of retransmissions that have occurred is greater than the threshold number. If the number of retransmissions that have occurred is less than or equal to the threshold number, then the UE may perform retransmission of the packet.

For example, with reference to FIG. 8, at any of the times $t_1$, $t_2$, $t_3$, $t_4$, the UE may suppress retransmission of the packet if the number of retransmissions of the packet that have occurred is greater than the threshold number. If the number of retransmissions of the packet that have occurred is less than or equal to the threshold number, then the UE may perform retransmission of the packet.

According to one aspect, the packet (e.g., packet 706) may be an application layer packet. According to a further aspect, the packet may be a TCP packet. The TCP packet may be one of the following types: SYN packet; FIN packet, or normal packet. A SYN packet is used to establish connections. For example, the SYN packet is sent to indicate that a new connection is to be established. A FIN packet is used to end connections. For example, a TCP connection is closed by sending a FIN packet. A normal packet is used to carry data.

As described earlier, a threshold number (or threshold value) may be based on (e.g., sized according to) the type of the packet. If the packet is a TCP packet, then, according to one aspect, the threshold number may be equal to a first value if the packet is a normal packet. Further, if the packet is a SYN packet, the threshold value may be equal to a second value. Further, if the packet is a FIN packet, the threshold value may be equal to a third value.

According to an aspect, the first value (corresponding to the packet being a normal packet) may be larger than the second value (corresponding to the packet being a SYN packet) and/or the third value (corresponding to the packet being a FIN packet). According to one aspect, the second value (corresponding to the packet being a SYN packet) may be larger than the third value (corresponding to the packet being a FIN packet).

For example, the second value (corresponding to the packet being a SYN packet) may be set equal to 3. As such, the retransmission of the SYN packet may be similar to the example described earlier with reference to FIG. 8). As such, the retransmission of the SYN packet may be performed up to 3 times (e.g., at $t_1$, $t_2$, and $t_3$).

Because normal packets carry data, successful transmission of a normal packet may be considered to be more important than successful transmission of the SYN packet (which is used to initiate connections). Accordingly, the first value may be set to be higher than the second value, such that a larger number of retransmissions of a normal packet are allowed, relative to the SYN packet. For example, if the second value is set equal to 3, the first value may be set equal to 4.

With reference to the timing diagram illustrated in FIG. 8, the UE may send an initial transmission of the normal packet at $t_0$=0 seconds. Further the UE may send retransmissions of the normal packet at $t_1$=0.5 seconds (0:005 minutes), $t_2$=1.5 seconds (0:015 minutes), $t_3$=3.5 seconds (0:035 minutes) and $t_4$=7.5 seconds (0:075 minutes). The RRC inactivity timer may be set to 10 seconds. In this situation, the UE is able to perform the 4 retransmissions of the normal packet before the RRC inactivity timer expires (e.g., 10 seconds after the initial transmission of the normal packet).

Because FIN packets are used only to end a connection, successful transmission of a FIN packet may be considered to be less important than successful transmission of the SYN packet (which is used to initiate connections). Accordingly, the third value may be set to be lower than the second value, such that a lower number of retransmissions of the FIN packet are allowed, relative to the SYN packet. For example, if the second value is equal to 3, the third value may be set equal to 2.

With reference to the timing diagram illustrated in FIG. 8, the UE may send an initial transmission of the FIN packet at $t_0$=0 seconds. Further, the UE may send retransmissions of the FIN packet at $t_1$=1 second (0:01 minutes) and $t_2$=3 seconds (0:03 minutes). By the arrival of $t_3$=7 seconds (0:07 minutes), the RRC inactivity timer (which may have set equal to 10 seconds) has not yet expired. However, because the number of transmissions has already reached the third value (e.g., 2), retransmissions of the FIN packet are suppressed, such that further retransmissions of the FIN packet are not performed. Accordingly, no retransmission of the FIN packet is performed at $t_3$=7 seconds.

Figure 9:
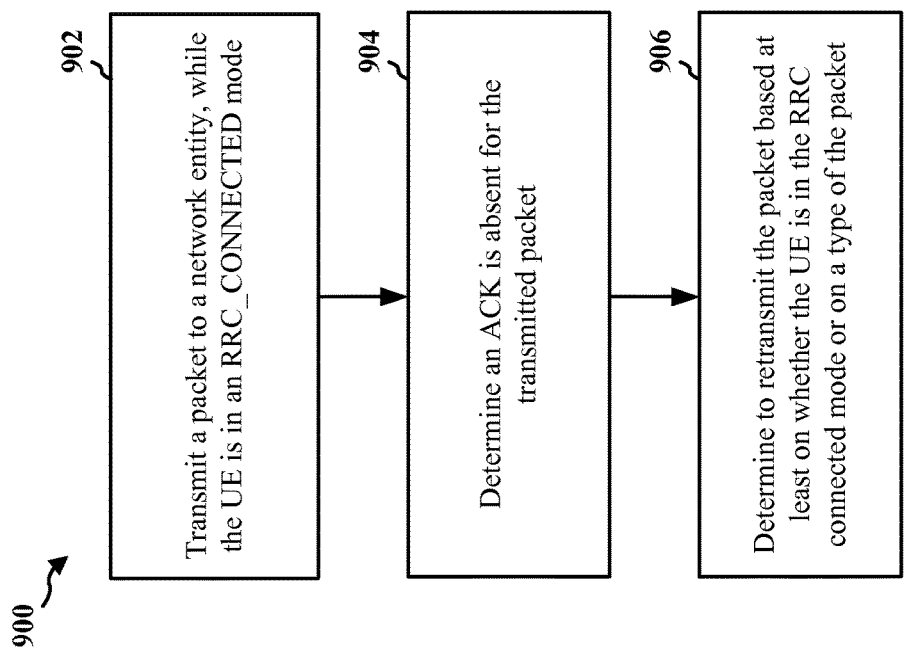
FIG. 9 is a flow chart of a method of wireless communication.

FIG. 9 is a flow chart 900 of a method of wireless communication. The method may be performed via a TCP. The method may be performed by a UE (e.g., the UE 206, 650, 704, TCP layer 710 of UE 704, the apparatus 1002/1002'). At 902, the UE transmits a packet to a network entity, while the UE is in an RRC_CONNECTED mode. For example, with reference back to FIG. 7, the UE 704 (e.g., TCP layer 710) transmits a packet 706 to a network entity (e.g., eNB 702). At this time, the UE 704 is in an RRC_CONNECTED mode.

At 904, the UE determines that an ACK is absent for the transmitted packet. For example, with reference back to FIG. 7, the UE 704 may monitor signals that are received from eNB 702, in order to detect the presence of an ACK/NAK 708 for the transmitted packet 706. The UE 704 may determine that the ACK/NAK 708 is absent if the presence of the ACK/NAK is not detected.

Finally, at 906, the UE determines to retransmit the packet based at least on whether the UE is in the RRC_CONNECTED mode or on a type of the packet. For example, the UE 704 may retransmit the packet upon determining the UE is in the RRC_CONNECTED mode. Further, the UE 704 may suppress retransmission of the packet upon determining that the UE is not in the RRC_CONNECTED mode (e.g., the UE is in the RRC_IDLE mode).

As another example, the UE 704 may retransmit the packet if a number of retransmissions of the packet is less than or equal to a threshold number. The threshold number may be based on the type of the packet (e.g., SYN packet, FIN packet, data packet). Further, the UE 704 may suppress retransmission of the packet if the number of retransmissions of the packet is greater than the threshold number.

Figure 10:
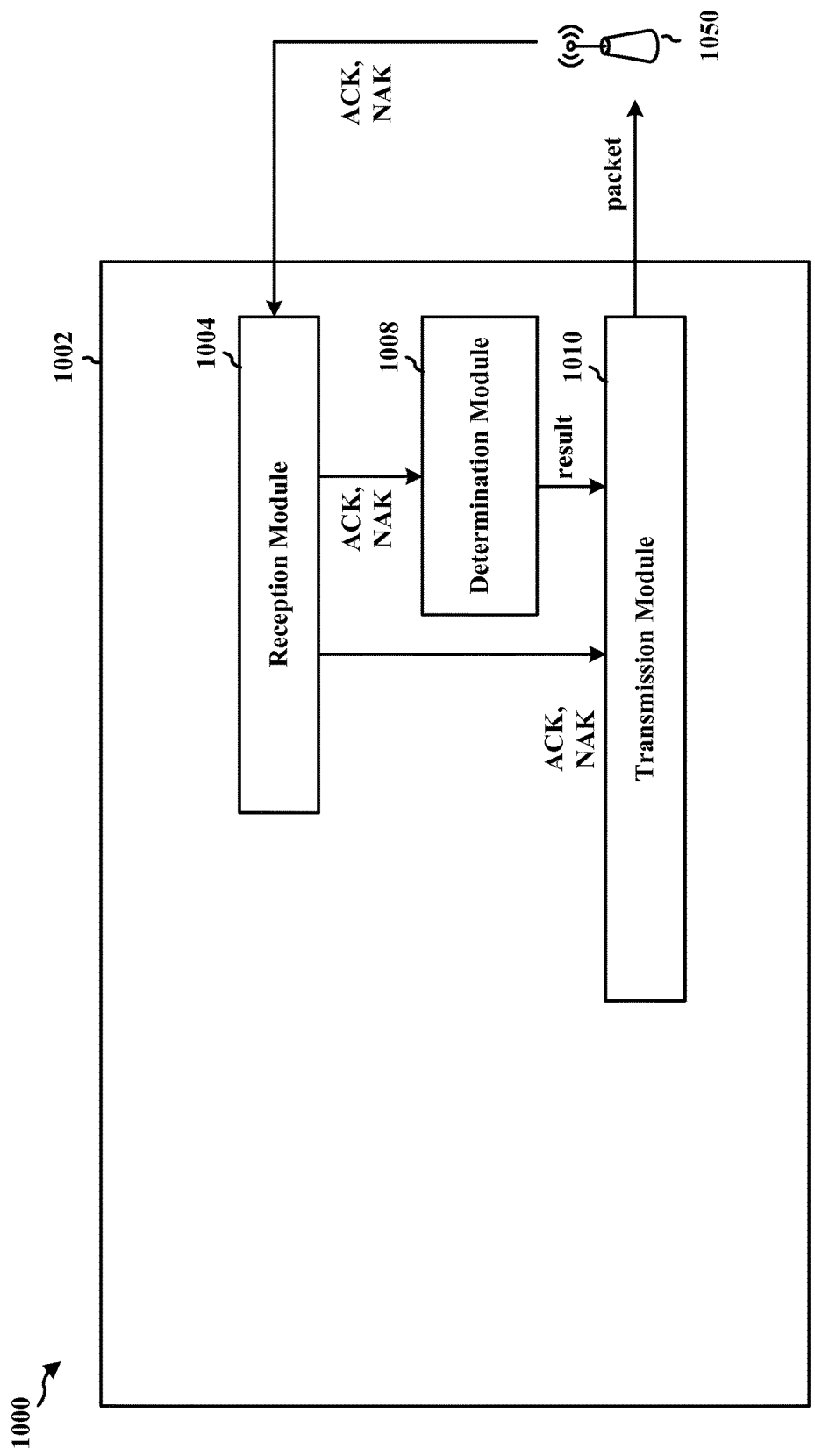
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a module 1010 that transmits a packet to an eNB 1050. The apparatus further includes a module 1004 that receives signals (e.g., ACK/NAK feedback) from the eNB 1050. The apparatus further includes a module 1008 that determines that an ACK is absent for the transmitted packet.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
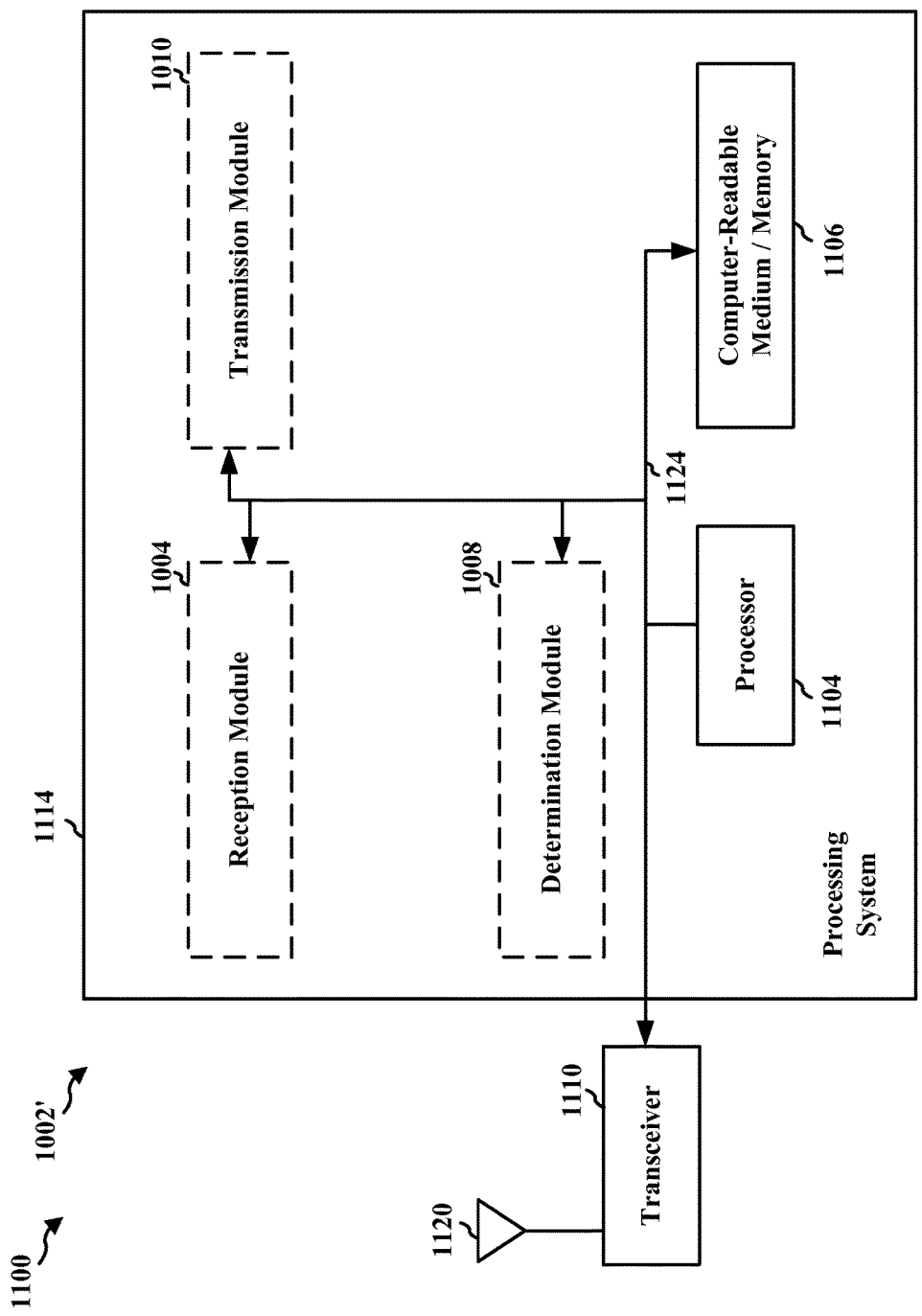
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception module 1004. In addition, the transceiver 1110 receives information from the processing system 1114, specifically the transmission module 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1008 and 1010. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means (e.g., 1010, 1110) for transmitting, by a UE, a packet to a network entity (e.g., an eNB), while the UE is in an RRC connected mode. The apparatus 1002/1002' further includes means (e.g., 1008, 1104) for determining an ACK is absent for the transmitted packet. The means (e.g., 1008, 1104) for determining may monitor signals received from the eNB. The means for determining may determine the ACK is absent in response to determining that no ACK for the transmitted packet is included in the monitored signals that are received from the eNB. The apparatus 1002/1002' further includes means (e.g., 1008, 1010, 1104, 1110) for determining to retransmit the packet based at least on whether the UE is in the RRC connected mode or on a type of the packet, upon determining the ACK is absent.

According to a further configuration, the means (e.g., 1008, 1010, 1104, 1110) for determining to retransmit the packet may be configured to retransmit the packet upon determining the UE is in the RRC connected mode. Further, the means (e.g., 1008, 1010, 1104, 1110) for determining to retransmit the packet may be configured to suppress retransmission of the packet upon determining that the UE is not in the RRC connected mode.

According to a further configuration, the means (e.g., 1008, 1010, 1104, 1110) for determining to retransmit the packet may be configured to retransmit the packet if a number of retransmissions of the packet is less than or equal to a threshold number. The threshold number may be based on the type of the packet.

According to yet a further configuration, the threshold number may be selected such that the retransmissions of the packet the threshold number of times can be performed before an RRC inactivity timer expires.

According to yet a further configuration, the means (e.g., 1008, 1010, 1104, 1110) for determining to retransmit the packet may be further configured to suppress retransmission of the packet if the number of retransmissions of the packet is greater than the threshold number.

According to yet a further configuration, the packet may be a TCP packet. The type of the packet may be a SYN packet, a FIN packet, or a normal packet. The threshold number for the normal packet may be larger than at least the threshold number for the SYN packet or the threshold number for the FIN packet.

According to yet a further configuration, the packet may be a TCP packet. The type of the packet may be a SYN packet, a FIN packet, or a normal packet. The threshold number for the SYN packet may be larger than the threshold number for the FIN packet. According to a further configuration, the packet may be a TCP packet. The packet type may be a SYN packet, a FIN packet, or a normal packet.

According to a further configuration, the packet may be an application layer packet. According to a further configuration, retransmission of the packet may occur at a timing based on a retransmission timing interval. According to yet a further configuration, a length of the retransmission timing interval may increase with each retransmission of the packet. According to a further configuration, the UE may exit the RRC connected mode after expiration of an RRC inactivity timer. According to a further configuration, the packet may be of a type such that successful transmission of the packet is followed by receipt of an ACK from the network entity.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
transmitting, by a user equipment (UE), a packet, to a network entity, while the UE is in a radio resource control (RRC) connected mode, the packet is a Transmission Control Protocol (TCP) packet;
determining an acknowledgment (ACK) is absent for the transmitted packet; and
determining to retransmit the packet based at least on whether the UE is in the RRC connected mode or on a type of the packet, upon determining the ACK is absent, the type of the packet is a SYN packet, a FIN packet, or a normal packet, wherein determining to retransmit the packet includes:
retransmitting the packet when a number of retransmissions of the packet is less than or equal to a threshold number for at least one of the SYN packet or the FIN packet; and
suppressing retransmission of the packet when the number of retransmissions of the packet is greater than the threshold number for at least one of the SYN packet, the FIN packet, or the normal packet,
wherein suppressing the packet includes adjusting an application program table to specify a source address of the packet for suppression,
wherein the threshold number is based on the type of the packet, and
wherein the threshold number for the SYN packet is larger than the threshold number for the FIN packet.

2. The method of claim 1, wherein the determining to retransmit the packet comprises:
retransmitting the packet upon determining the UE is in the RRC connected mode; or
suppressing retransmission of the packet upon determining that the UE is not in the RRC connected mode.

3. The method of claim 1, wherein:
the packet is a Transmission Control Protocol (TCP) packet.

4. The method of claim 1, wherein the packet is an application layer packet.

5. The method of claim 1, wherein retransmission of the packet occurs at a timing based on a retransmission timing interval.

6. The method of claim 5, wherein a length of the retransmission timing interval increases with each retransmission of the packet.

7. The method of claim 1, wherein the UE exits the RRC connected mode after expiration of an RRC inactivity timer.

8. The method of claim 1, wherein the packet is of a type such that successful transmission of the packet is followed by receipt of an ACK from the network entity.

9. An apparatus for wireless communication, comprising:
means for transmitting, by a user equipment (UE), a packet to a network entity, while the UE is in a radio resource control (RRC) connected mode, the packet is a Transmission Control Protocol (TCP) packet;
means for determining an acknowledgment (ACK) is absent for the transmitted packet; and
means for determining to retransmit the packet based at least on whether the UE is in the RRC connected mode or on a type of the packet, upon determining the ACK is absent, the type of the packet is a SYN packet, a FIN packet, or a normal packet, wherein the means for determining to retransmit the packet includes:
means for retransmitting the packet when a number of retransmissions of the packet is less than or equal to a threshold number for at least one of the SYN packet or the FIN packet; and
means for suppressing retransmission of the packet when the number of retransmissions of the packet is greater than the threshold number for at least one of the SYN packet, the FIN packet, or the normal packet,
wherein the means for suppressing the packet includes means for adjusting an application program table to specify a source address of the packet for suppression,
wherein the threshold number is based on the type of the packet, and
wherein the threshold number for the SYN packet is larger than the threshold number for the FIN packet.

10. The apparatus of claim 9, wherein the transmitter is further configured to:
retransmit the packet upon determining the UE is in the RRC connected mode; or
suppress retransmission of the packet upon determining that the UE is not in the RRC connected mode.

11. The apparatus of claim 9, wherein:
the packet is a Transmission Control Protocol (TCP) packet.

12. The apparatus of claim 9, wherein the packet is an application layer packet.

13. The apparatus of claim 9, wherein retransmission of the packet occurs at a timing based on a retransmission timing interval.

14. The apparatus of claim 13, wherein a length of the retransmission timing interval increases with each retransmission of the packet.

15. The apparatus of claim 9, wherein the UE exits the RRC connected mode after expiration of an RRC inactivity timer.

16. The apparatus of claim 9, wherein the packet is of a type such that successful transmission of the packet is followed by receipt of an ACK from the network entity.

17. An apparatus for wireless communication, comprising:
a memory; and
at least one processor coupled to the memory and configured to:
transmit, by a user equipment (UE), a packet to a network entity, while the UE is in a radio resource control (RRC) connected mode, the packet is a Transmission Control Protocol (TCP) packet;
determine an acknowledgment (ACK) is absent for the transmitted packet; and
determine to retransmit the packet based at least on whether the UE is in the RRC connected mode or on a type of the packet, upon determining the ACK is absent, the type of the packet is a SYN packet, a FIN packet, or a normal packet, wherein to determine to retransmit the packet, the at least one processor is further configured to:
retransmit the packet when a number of retransmissions of the packet is less than or equal to a threshold number for at least one of the SYN packet or the FIN packet; and
suppress retransmission of the packet when the number of retransmissions of the packet is greater than the threshold number for at least one of the SYN packet, the FIN packet, or the normal packet,
wherein to suppress the packet, the at least one processor is further configured to adjust an application program table to specify a source address of the packet for suppression, wherein the threshold number is based on the type of the packet, and wherein the threshold number for the SYN packet is larger than the threshold number for the FIN packet.

18. The apparatus of claim 17, wherein the at least one processor is further configured to determine to retransmit the packet by:

retransmitting the packet upon determining the UE is in the RRC connected mode; or suppressing retransmission of the packet upon determining that the UE is not in the RRC connected mode.

19. A non-transitory computer-readable medium storing computer executable code for wireless communication, comprising code for:

transmitting, by a user equipment (UE), a packet to a network entity, while the UE is in a radio resource control (RRC) connected mode, the packet is a Transmission Control Protocol (TCP) packet;

determining an acknowledgment (ACK) is absent for the transmitted packet; and determining to retransmit the packet based at least on whether the UE is in the RRC connected mode or on a type of the packet, upon determining the ACK is absent, the type of the packet is a SYN packet, a FIN packet, or a normal packet, wherein determining to retransmit the packet includes:

retransmitting the packet when a number of retransmissions of the packet is less than or equal to a threshold number for at least one of the SYN packet or the FIN packet; and suppressing retransmission of the packet when the number of retransmissions of the packet is greater than the threshold number for at least one of the SYN packet, the FIN packet, or the normal packet, wherein suppressing the packet includes adjusting an application program table to specify a source address of the packet for suppression, wherein the threshold number is based on the type of the packet, and wherein the threshold number for the SYN packet is larger than the threshold number for the FIN packet.

20. The non-transitory computer-readable medium of claim 19, further comprising code for:

retransmitting the packet upon determining the UE is in the RRC connected mode; or suppressing retransmission of the packet upon determining that the UE is not in the RRC connected mode.

* * * * *